United States Patent Office 2,934,334
Patented Apr. 26, 1960

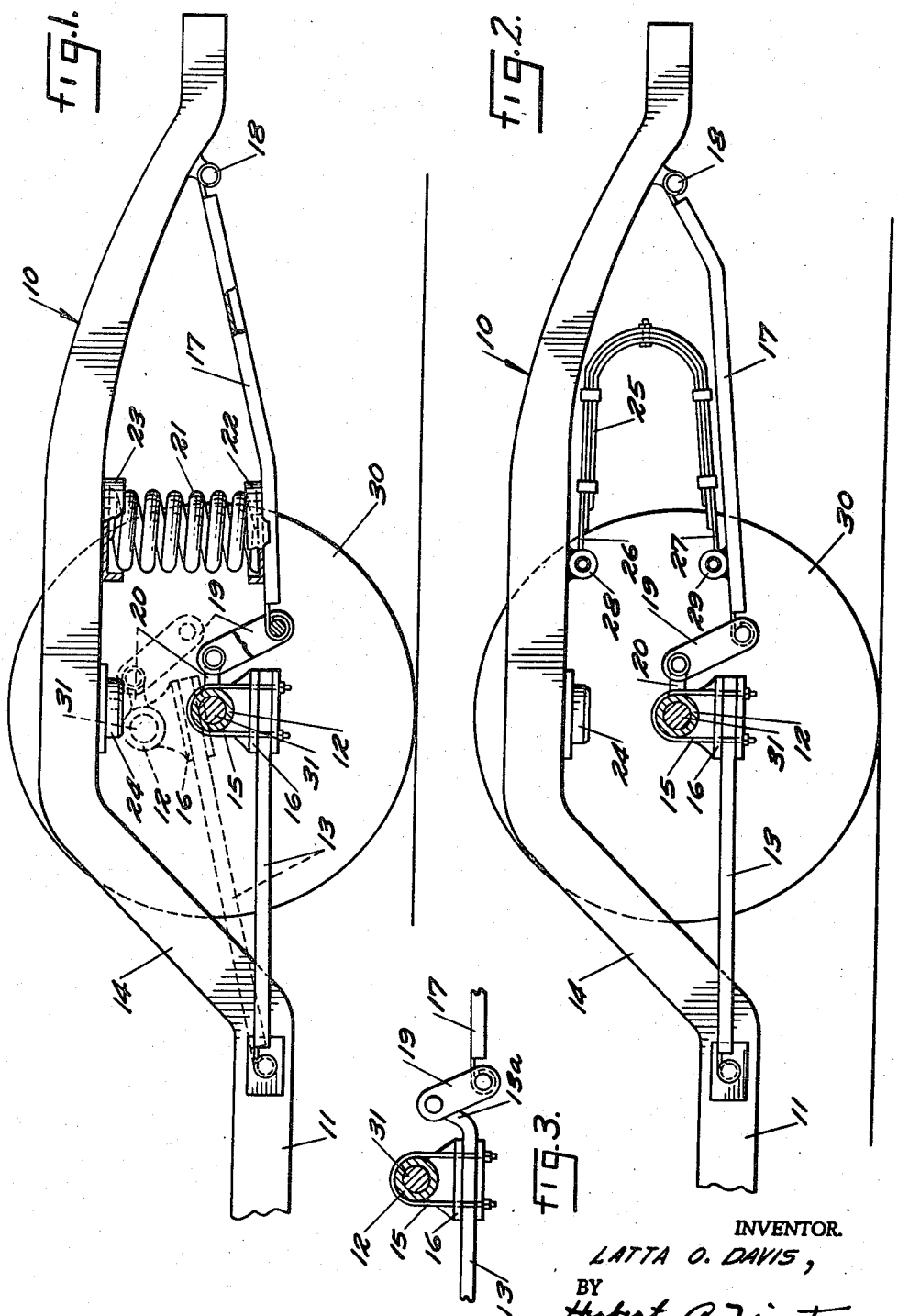

2,934,334

VEHICLE SPRING SUSPENSION

Latta O. Davis, Indianapolis, Ind.

Application January 10, 1958, Serial No. 708,129

3 Claims. (Cl. 267—19)

This invention relates to a spring suspension finding particular use in vehicles such as automobiles including trucks and the like. The invention permits use of coil springs of U-shaped leaf springs. The invention involves a structure wherein the vehicle will be driven by non-flexing drive bars directly from the axle housing and the spring suspension is located rearwardly of that housing.

The invention also provides for an axle housing mounting on non-flexing drive bars so that, contrary to the heretofore Hotchkiss drive, no drive is taken through springs, and the result is that the drive is positive between the chassis and the axle housing without tending to cause the front end of the vehicle to lift or lower under accelerating or decelerating drive conditions due to tendency of the axle housing to revolve. Contrary, the axle housing is rigidly mounted on the drive bars which are non-flexing, and the load of the vehicle is entirely separate from the drive means, and yet such spring means is supported between the chassis to the rear of the axle and by a front member directly to the axle housing.

The invention provides for not only a simple construction, but also for greater ease in riding, all in the absence of driving through springs.

These and other objects and advantages of the invention will become apparent in the following description of one particular form of the invention as illustrated in the accompanying drawing, in which Fig. 1 is a view in side elevation and in partial section of a structure embodying the invention;

Fig. 2 is a view in side elevation and partial section of the invention employing a U-shaped spring; and Fig. 3 is a detail in side elevation of a modified form of shackle support.

The usual chassis has a side member 10 which has a central lower portion 11 from which the member 10 arches upwardly and over the axle housing 12. A rigid drive bar 13 is rockably attached to the chassis member 10, herein at a zone substantially at the junction of the lower part 11 and the upwardly inclined portion 14 of the member 10. The bar 13 is hinged to the member 10 to be constrained to vertical travel as is the ordinary custom in attaching the heretofore employed semi-elliptic spring.

The drive bar 13 extends rearwardly and preferably under the axle housing 12 to which the housing is rigidly secured by any suitable means, herein shown as by the U bolt 15 which holds the drive bar 13 against the underside of the pad 16. By means of this construction, the axle housing 12 transmits the driving force in both forwardly and rearwardly directions directly through the rigid drive bar 13.

A rigid, non-flexing spring bar 17 is hinged to the member 10 at a position therealong indicated by the numeral 18 to swing freely from the member 10, and to extend from that position 18 forwardly toward the axle housing 12. The spring bar 17 is rockably engaged at its forward end by a spring shackle 19 which in turn is rockably carried by the housing 12 herein shown as either through an intervening bracket 20 or an end 13a of the bar 13. In either event, the shackle 19 may rock in relation to the housing 12.

Referring to Fig. 1, a coil spring 21 rests by its lower end on a pad 22 carried by the spring bar 17, and bears by its upper end against a pad 23 secured to the member 10.

When a load is imposed on the member 10, the spring 21 will tend to be compressed, causing the spring bar 17 to tend to rock relatively upwardly by its forward end toward the member 10 to a limited position as indicated by the dash lines where the axle housing will under extreme conditions strike a rubber bumper stop 24 carried by the member 10. Normally the spring 21 will be so designed that the drive bar 13 will be approximately horizontally disposed, although angular variations may be had depending of course upon the load imposed on the member 10.

Referring to Fig. 2, the same construction is herein shown, and the only variation lies in the spring between the member 10 and the spring bar 17. In this form, there is employed a U-shaped leaf spring 25 which has the closed end at the rearmost position, and the respective ends 26 and 27 rockably interconnected respectively through the bracket 28 fixed on the member 10 and the bracket 29 fixed on a forward portion of the spring bar 17.

In both forms of the spring, the shackle 19 may rock about the front end of the spring member 17, in view of the fact that the drive bar 13 is pivotally connected at a forward zone on the member 10 and the spring bar 17 is pivotally connected at a rear end portion of the member 10 with the axle housing 12 positioned therebetween.

The wheel 30 is driven in the usual manner by an axle 31 extending from the housing 12. It is to be understood of course that the construction of the above defined will be employed on both sides of the vehicle, one structure adjacent each wheel 30. Moreover, the structure defined is primarily intended to be employed at the driving axle as opposed to the front mounting of wheels which do not have to carry a drive mechanism. However the same construction constituting the invention may also be employed at the front wheels if so desired.

By use of the invention, not only is a smoother ride obtained, but by applying the load to the rear axle housing 12 from behind, a better control of the vehicle is had as compared to the heretofore spring mountings and driving through springs. Upon the wheel striking some object such as the edge of a chuckhole, or some object elevated above the surface of the road such as a rock or a brick, the upward thrust is taken by the spring, not mounted on the axle housing, but to the rear thereof, while the drive bar does not flex, but remains rigid, tending to "soften" the impact by reason of the spring being positioned between the axle and the spring bar hinge connection with the chassis frame member.

By reason of the mounting of the spring 21 to bear between the second class lever (spring bar 17), the chassis member 10 at the pivot 18 will tend to remain stationary when the wheel 30 rises over an obstacle (within the range of permissible compression of the spring 21 under the load on the member 10), and this factor is what contributes to the easy riding quality, the shock on the wheel 30 being absorbed through the spring resisting the travel of the lever 17.

Therefore while I have described my invention in the particular forms, it is apparent that structural changes may be employed without departing from the spirit of the invention, and I therefore do not desire to be limited to those precise forms beyond the limitations which may be imposed by the following claims.

I claim:

1. A spring suspension for a vehicle comprising the combination with a vehicle load carrying member having a length extending in fore and aft directions and a supporting axle, of a drive bar and a spring carrying bar; both of said bars approaching said axle by free ends and having their other ends hingedly connected to said vehicle member; the free end of the drive bar being fixed to said axle; a loose, non-driving connection between said spring bar free end and said axle, supporting the spring bar free end from the axle and permitting variable spacing apart of said bar free ends set up by the rocking of the two bars about their hinged ends; and a U-shaped spring having one end carried by said vehicle member and the other end carried by said spring bar compressibly interposed between said vehicle member and said spring bar intermediate its ends normally tending to rock said spring bar to a greater angle between it and said member upon expansion of the spring.

2. In a spring suspension for a vehicle, a vehicle load carrying frame member; an axle disposed transversely of the frame member; a rigid drive bar hinged to said member about a fixed axis relative to the member; and an end portion of said drive bar being spaced from said axis and fixed to said axle; a rigid spring carrying bar hinged to said member about a fixed axis relative to the member, the axis of hinging of the spring bar being spaced on the opposite side of the axle from said drive bar axis, the spring bar extending from its said hinge axis by a length terminating by an end adjacent the axle; shackle means interengaging said end with said axle; and a spring interposed between and bearing by opposite ends in fixed positions between said frame member and said spring bar intermediate the shackle and hinged ends of the spring bar.

3. The structure of claim 2 in which the lower end of said spring is adjacent the shackle end of the spring bar.

References Cited in the file of this patent

UNITED STATES PATENTS

| | | |
|---|---|---|
| 1,083,734 | Dunn | Jan. 6, 1914 |
| 1,280,236 | Killen | Oct. 1, 1918 |
| 1,767,750 | Fisher | June 24, 1930 |
| 2,483,185 | Crabtree | Sept. 27, 1949 |

FOREIGN PATENTS

| | | |
|---|---|---|
| 149,629 | Great Britain | Sept. 22, 1921 |